United States Patent
Guney (12)

(10) Patent No.: US 10,459,909 B2
(45) Date of Patent: Oct. 29, 2019

(54) SYSTEM FOR PROVIDING A TIME-LIMITED MUTUAL EXCLUSIVITY LOCK AND METHOD THEREFOR

(71) Applicant: WAL-MART STORES, INC., Bentonville, AR (US)

(72) Inventor: Ergin Guney, San Francisco, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 18 days.

(21) Appl. No.: 14/995,037

(22) Filed: Jan. 13, 2016

(65) Prior Publication Data
US 2017/0199704 A1    Jul. 13, 2017

(51) Int. Cl.
G06F 17/30    (2006.01)
G06F 16/23    (2019.01)
G06F 9/46    (2006.01)

(52) U.S. Cl.
CPC ............ *G06F 16/2343* (2019.01); *G06F 9/46* (2013.01)

(58) Field of Classification Search
CPC .............. G06F 17/30171; G06F 9/526; G06F 17/30362; G06F 12/1466; G06F 2009/45583; G06F 11/00; G06F 11/0778; G06F 11/0784; G06F 12/14; G06F 12/1416; G06F 9/466; G06F 9/485; G06F 9/50; G06F 11/0709; G06F 11/0751; G06F 9/52; G06F 11/0757; G06F 11/2035; G06F 11/30; G06F 17/30348; G06F 17/30371; G06F 9/524; G06F 11/1464

See application file for complete search history.

(56) References Cited

U.S. PATENT DOCUMENTS

| | | | | |
|---|---|---|---|---|
| 5,369,764 A * | 11/1994 | Blair | ................... | G06F 11/3466 |
| 5,657,474 A * | 8/1997 | Paul Dubois Taine | ...................... | |
| | | | | G06F 9/466 |
| | | | | 707/999.201 |
| 5,740,367 A * | 4/1998 | Spilo | ................... | G06F 12/0813 |
| | | | | 709/201 |
| 6,016,500 A * | 1/2000 | Waldo | ................... | G06F 9/4411 |
| 6,108,654 A * | 8/2000 | Chan | ......................... | G06F 9/52 |
| 6,237,009 B1 * | 5/2001 | Waldo | ................... | G06F 9/4411 |
| 6,493,804 B1 * | 12/2002 | Soltis | ................... | G06F 12/0815 |
| | | | | 707/999.009 |
| 9,417,812 B1 * | 8/2016 | Palekar | ................. | G06F 3/0683 |

(Continued)

OTHER PUBLICATIONS

Distributed locks with Redis. http://redis.io/topics/distlock, 9 pages.

*Primary Examiner* — Adam M Queler
*Assistant Examiner* — Alex G Olson
(74) *Attorney, Agent, or Firm* — Bryan Cave Leighton Paisner LLP (57) ABSTRACT

A system and method for providing mutual exclusivity to an operation is presented. A memory location is checked to determine if the memory location is subject to an exclusive lock. If so, the age of the exclusive lock is determined. If the age of the exclusive lock is greater than a certain length of time, the exclusive lock on the memory location is released such that operations can be performed on the memory location. When a memory lock is created, a length of time can be associated with the memory location. The length of time can be a default length of time. The length of time can be a custom length that is stored in a database. Other embodiments also are disclosed.

20 Claims, 4 Drawing Sheets

(56) References Cited

U.S. PATENT DOCUMENTS

| | | | |
|---|---|---|---|
| 2002/0052959 A1* | 5/2002 | Freitas | G06F 9/526 709/226 |
| 2003/0217241 A1* | 11/2003 | Chong, Jr. | G06F 9/526 711/163 |
| 2004/0143712 A1* | 7/2004 | Armstrong | G06F 9/526 711/152 |
| 2004/0186825 A1* | 9/2004 | Dettinger | G06F 17/30362 |
| 2006/0074940 A1* | 4/2006 | Craft | G06F 17/30194 |
| 2006/0168256 A1* | 7/2006 | Fuente | G06F 11/2023 709/229 |
| 2007/0143766 A1* | 6/2007 | Farchi | G06F 9/524 718/104 |
| 2008/0250213 A1* | 10/2008 | Holt | G06F 9/526 711/159 |
| 2010/0017409 A1* | 1/2010 | Rawat | G06F 17/30171 707/E17.007 |
| 2010/0275209 A1* | 10/2010 | Detlefs | G06F 9/526 718/102 |
| 2010/0332770 A1* | 12/2010 | Dice | G06F 9/526 711/148 |
| 2011/0107036 A1* | 5/2011 | Resch | H04L 12/00 711/154 |
| 2011/0276542 A1* | 11/2011 | Whitehouse | G06F 17/30171 707/688 |
| 2011/0276690 A1* | 11/2011 | Whitehouse | G06F 9/526 709/226 |
| 2011/0296028 A1* | 12/2011 | Sasaoka | G06F 9/526 709/226 |
| 2012/0072692 A1* | 3/2012 | Sudhakar | G06F 9/526 711/163 |
| 2013/0086333 A1* | 4/2013 | Shen | G06F 9/526 711/152 |
| 2013/0205108 A1* | 8/2013 | Perelstein | G06F 11/1492 711/162 |
| 2013/0339560 A1* | 12/2013 | Aoshima | G06F 9/526 710/200 |
| 2014/0019699 A1* | 1/2014 | Cohen | G06F 12/14 711/163 |
| 2014/0040898 A1* | 2/2014 | Karp | G06F 9/466 718/101 |
| 2014/0068127 A1* | 3/2014 | Baron | G06F 9/526 710/200 |
| 2014/0172792 A1* | 6/2014 | Kabano | G06F 17/30578 707/625 |
| 2015/0379099 A1* | 12/2015 | Vermeulen | G06F 17/30575 707/634 |

* cited by examiner

SYSTEM FOR PROVIDING A TIME-LIMITED MUTUAL EXCLUSIVITY LOCK AND METHOD THEREFOR

TECHNICAL FIELD

This disclosure relates generally to computing systems, and relates more particularly to computing systems with shared sets of data.

BACKGROUND

Computing systems can encounter a situation in which multiple processes are attempting to read or write a certain location simultaneously. In order to prevent such simultaneous access (sometimes called race conditions), locks are sometimes used. Problems can occur when a process fails to release a lock. It is desirable to have a more efficient manner in which locks can be implemented.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can include: one or more processing modules; and one or more non-transitory memory storage modules storing computing instructions configured to run on the one or more processing modules and perform the acts of: determining if an exclusive lock is present on a memory location; determining an age of the exclusive lock of the memory location; and if the age of the exclusive lock is greater than a first length of time, releasing the exclusive lock of the memory location.

Some embodiments include a method. The method can include: determining if an exclusive lock is present on a memory location; determining an age of the exclusive lock of the memory location; and if the age of the exclusive lock is greater than a first length of time, releasing the exclusive lock of the memory location.

Some embodiments include a computer readable storage medium. The computer readable storage medium can have data stored therein representing software executable by a computer. The storage medium can comprise: instructions for determining if an exclusive lock is present on a memory location; instructions for determining an age of the exclusive lock of the memory location; and if the age of the exclusive lock is greater than a first length of time, instructions for releasing the exclusive lock of the memory location.

Figure 1:
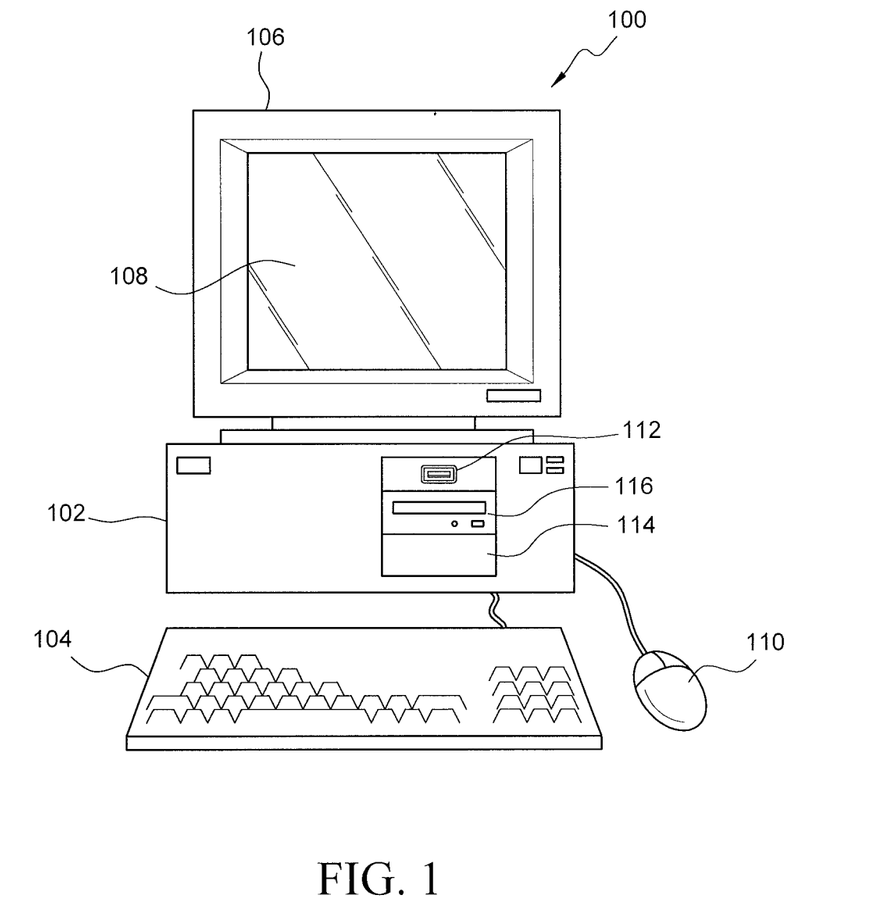
FIG. 1 illustrates a front elevation view of a computer system that is suitable for implementing at least part of a central computer system.
Figure 2:
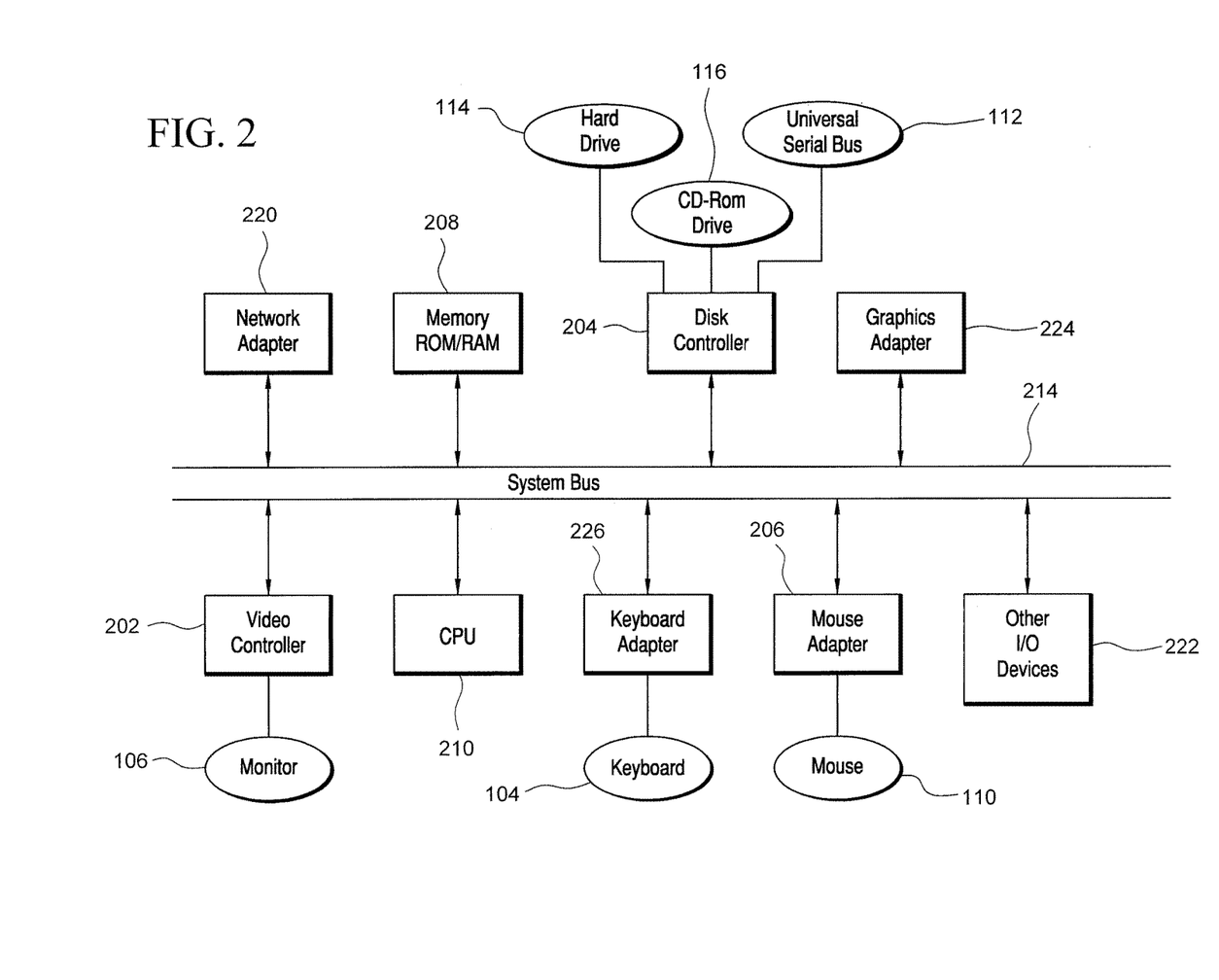
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a drive 114. Drive 114 can be a hard drive that uses spinning magnetic disks to store data or it can be a solid state drive (SSD) that uses a fast, non-volatile memory for storage. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via One or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

There are many situations in which multiple processes attempt to read/write the same memory location. This situation can be present in a single computing system where multiple programs are attempting to access the same portion of RAM or non-transitory storage media (such as a hard drive or a solid state drive). This situation also can be present in shared computing systems, such as a database system with multiple clients accessing the same databases or tables. Additionally, this situation can be present in many other different types of computing situations. In such an environment where multiple software components or processes are working on a shared set of data (e.g., files in a file system or a database accessible to all), allowing simultaneous changes to be made to the data by more than one component could cause corruption to the data.

To illustrate a possible corruption, consider an example of a centralized counter that is being maintained by multiple processes. Each time the counter is to be incremented (in response to one particular occurrence of whichever event the counter is supposed to hold a count of), the steps of the operation would consist of (1) read the current value, (2) add 1 to the value that was read, and (3) write back the new value. In a system in which only a single computer process is being used, such a system will operate without any incident. However, a problem could arise when two processes happen to perform step 1 at a point in time before either of them had made it through step 3 in their respective increment operations. This would result in the counter ending up with a value that is lower than the value it should hold by a count of one. Here is the scenario in a sample flow:

Time t1: process A reads the count, which is currently 0.
Time t2: process A computes the incremented value of the count (0+1=1).
Time t3: process B reads the count, which is still 0.
Time t4: process A writes back the new/incremented value for the counter, which is 1.
Time t5: process B computes the incremented value of the count (0+1=1).
Time t6: process B writes back the new/incremented value for the counter, which is 1.

The counter thus ends up at a value of 1, whereas it should have reached 2 after these two increment operations. It should be noted that the same result would occur even if time t3 occurred before time t2.

In order to prevent such a situation, a write lock can be used to avoid this "race condition." Each process can be required to obtain a write lock (effectively a permission) before it can increment the counter or (in some instances) before it can even read the counter. This lock temporarily gives a particular software process exclusive rights to make a change. No process will be allowed to change the value without first obtaining the write lock. Any process that needs to make a change that cannot obtain the write lock (e.g., because some other component is currently holding it) needs to wait and retry later. The above-described counter will now be described in conjunction with a write lock.

Time t1: process A obtains a write lock on the counter.
Time t2: process A reads the counter, which is currently 0.
Time t3: process A computes the incremented value of the counter (0+1=1).
Time t4: process B attempts to obtain a write lock on the counter, but is prevented from doing so because process A has locked the counter. The write lock blocks process B from obtaining the lock until process A releases the write lock.
Time t5: process A writes back the new/incremented value for the counter, which is 1.
Time t6: process A releases the write lock.
Time t7: process B re-attempts to obtain the write lock while in a re-attempt loop and obtains a write lock on the counter.
Time t8: process B reads the counter, which is currently 1.
Time t9: process B computes the incremented value of the counter (1+1=2).
Time t10: process B releases the write lock.

In this second implementation, process B is prevented from making any changes to the counter by process A's write lock on the counter. Thus, there are no problems of race conditions, and the correct value of the counter is obtained.

This second implementation is a common concept in computer science, commonly referred to as a mutually exclusive lock ("mutex").

The concept is not restricted to write operations. It can be expanded to read operations as well, in which case it can prevent components from making changes (writes) to content while another component is in the process of reading the content. This helps in cases where a read operation might consist of accessing multiple pieces of information via a succession of read operations, where the results of all of these read operations need to reflect values coming from a consistent state. The possibility that another component could start making changes to the data being read midway through the succession of read calls could result in an inconsistent state of the overall information that was read.

The above-described method for any single process can be set forth in pseudo-code as follows:

1) Determine if an exclusive lock currently exists on the memory location in question.
2) If there is no exclusive lock, continue to step 3. If an exclusive lock does exist, go back to step 1 after an optional waiting period.
3) Create an exclusive lock for the memory location.
4) Perform the operation.
5) Release (delete) the exclusive lock.

In this context, the exclusive lock is effectively a data entry in a data store (such as a row in a database table) that represents the information "process X holds the exclusive lock", where process X is the software process (or a computer host, in a multi-host interaction scenario) that holds the exclusive lock, and where there can be only one such entry at any given time.

One potential problem with this approach arises when the software process that holds the exclusive lock fails to release the lock in step 5 above. This situation could occur in tightly coupled contexts, such as when there are a number of concurrent threads running in the same memory space within one computer program), due to deadlocks or exceptions, or in loosely coupled contexts (e.g., a number of computers interacting with each other across a network) due to a computer that was holding the lock crashing or becoming disconnected from the network. If no other mechanisms are implemented to remedy this scenario, this situation would leave the system with an unremoved lock that prevents further changes to the memory location for which the lock is being enforced.

Figure 3:
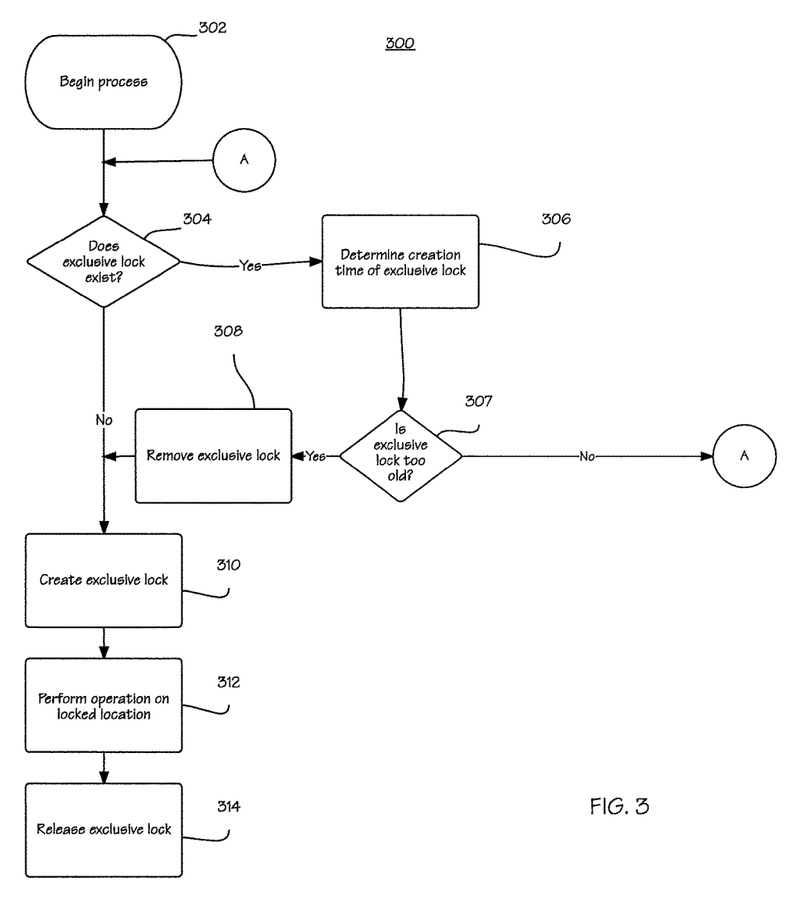
FIG. 3 is a flowchart illustrating the operation of an embodiment.

A flowchart illustrating a method 300 of alleviating such problems through the use of an age limit of an exclusive lock is presented in FIG. 3. Method 300 is merely exemplary and is not limited to the embodiments presented herein. Method 300 can be employed in many different embodiments or examples not specifically depicted or described herein. In some embodiments, the procedures, the processes and/or the activities of method 300 can be performed in the order presented. In other embodiments, the procedures, the processes, and/or the activities of method 300 can be performed in any other suitable order. In still other embodiments, one or more of the procedures, the processes, and/or the activities of method 300 can be combined or skipped. In some embodiments, portions of method 300 can be implemented by computer system 100 (FIG. 1).

Method 300 might be executed in any situation in which a computer process wishes to have exclusive access to a memory location, whether the memory location is temporary storage, such as RAM, non-transitory storage, such as a solid state drive (SSD) or hard drive, or any other type of memory. This method also can be executed in any type of computer system, whether it is a single computer, or a network of computers. The computers can be in any form factor, such as a portable electronic device, a smartphone, laptop, a tablet, a desktop, a server, a set top box, and any other type of computing device.

In some embodiments, a basic idea involves (1) the inclusion of a creation timestamp for the exclusive lock, and (2) the enforcement of a maximum allowed age for the exclusive lock.

At the beginning of the process (block 302), a computing process might desire an exclusive lock on a memory location. It checks if an exclusive lock currently exists for the memory location in question (block 304). If there is an exclusive lock, the creation time of the exclusive lock is determined (block 306) to determine the age of the exclusive lock. Then, the age, life, or duration of the exclusive lock is examined (block 307). If the age of the exclusive lock is greater than a specified amount such that the lock is too old, then the exclusive lock is removed (block 308). Otherwise, the process rechecks if the exclusive lock remains (block 304). Optionally, there can be a delay between blocks 308 and 304.

The "specified amount" can take one of a variety of different forms. In some embodiments, there might be a globally defined "maximum allowed age" that is applicable to all exclusive locks of a given type. In some embodiments, the maximum allowed age can be a default for the "specified amount." In other words, unless there is a modification to the specified amount, the specified amount is set to the maximum allowed age.

In some embodiments, an "expected duration" value might be saved in the exclusive lock along with the creation time in a database. This "expected duration" value can then be used as the specified amount for that particular exclusive lock. This embodiment can allow for short age limits to be set for locks that are created for short and simple operations, allowing such operations to "time out" more quickly, while longer operations can use locks that lost a longer period of time. In the absence of this enhancement, system 300 would define the maximum age of an exclusive lock to match at least the expected duration of the longest conceivable operation that may need to be performed while holding that lock, meaning that any "stuck" locks that were obtained for even very short operations will not be cleared out before that long time period elapses, if the exclusive lock happens to get stuck.

Thereafter, returning to the flowchart in FIG. 3, method 300 continues with the creation of an exclusive lock, at the same block as the situation when there is no exclusive lock. At block 310, an exclusive lock is created. The write operation for which the exclusive lock was created is then performed (block 312). It should be understood that other types of operations can be used instead of a write operation. For example, the exclusive lock might be used in order to perform one or more write operations to the locked portion of memory. The exclusive lock might be used in order to perform one or more read operations from the locked portion of memory. A combination of reads and writes might be performed. Thereafter, the exclusive lock is released (block 314).

In order to safely implement method 300, the logic that performs any operation that is subject to this kind of a lock also might include additional checks that are executed before finalizing a write operation (such as at block 312) to verify that the exclusive lock it holds is still in effect. In other words, as an example, after a first software component obtains an exclusive lock with a maximum age of five seconds, its operation may take seven seconds by the time the changes to be made can be completed, by which time a second component may have cleared out the lock due to the length of time the lock was in force. The second component might have obtained a new lock itself, and started performing other changes on the same piece of data. This possibility could be mitigated by one of several different approaches.

In one embodiment, the logic that performs the change could be structured so that, before it starts applying changes to the actual data, it can perform a check of the age of the lock to make sure that the lock is younger than the maximum allowed age by at least a margin equal to the expected duration of the final write operation.

For example, there might be a situation where an operation is expected to execute in 1 to 3 seconds and whose actual write to the data store is expected to take 0.5 seconds. The operation might create an exclusive lock with a maximum age of 5 seconds. An exemplary operation might involve reading data, performing a calculation on the data, then writing new data. The exclusive lock might be obtained prior to the reading and calculation steps. After the reading and calculation steps are performed, the logic can determine the time requirement for the remainder of the operation. Thereafter, the logic can check the remaining time of the exclusive lock. If there is still enough time to complete the write before the exclusivity of the lock is lost, then the operation can continue. If it is estimated that the lock will expire before the operation completes, the operation can be aborted and treated as a timeout error.

In one embodiment, the write operation can be performed using a "two-phase commit" approach. For data stores that support this kind of operation, all changes that are written will remain in a "pending" state (and not reflected in the results of read operations performed in the interim) until a final "commit" operation also is performed to finalize the write process. In this situation, before issuing the commit command, the logic performing the operation that is subject to the exclusive lock can verify that the age of the lock still has an amount of time left that is equal to or greater than the amount of time the commit operation is expected to take. If not, the pending changes can be rolled back, and the operation treated as having experienced a timeout error.

The above-described method can be handled in the library or API call implementing this locking scheme and, thus, made completely transparent to the client software. In such a situation, all that the client software would have to do is make a "requestLock" call and pass the expected duration of the lock as an argument.

In data storage solutions that natively support a "maximum time to live" (TTL) setting for a given piece of data, this kind of scheme can be implemented without the inclusion of any additional pieces of information, such as the creation time and maximum allowed age, or any extra checks in the logic built around the locking mechanism. In such cases, simply setting the TTL value of the entry representing the lock to the allowed maximum age of the lock will result in a data store automatically removing that entry once that amount of time has elapsed. However, the benefit of this approach is in the flexibility it allows to implement the same logic on platforms that don't have a TTL feature built in.

Figure 4:
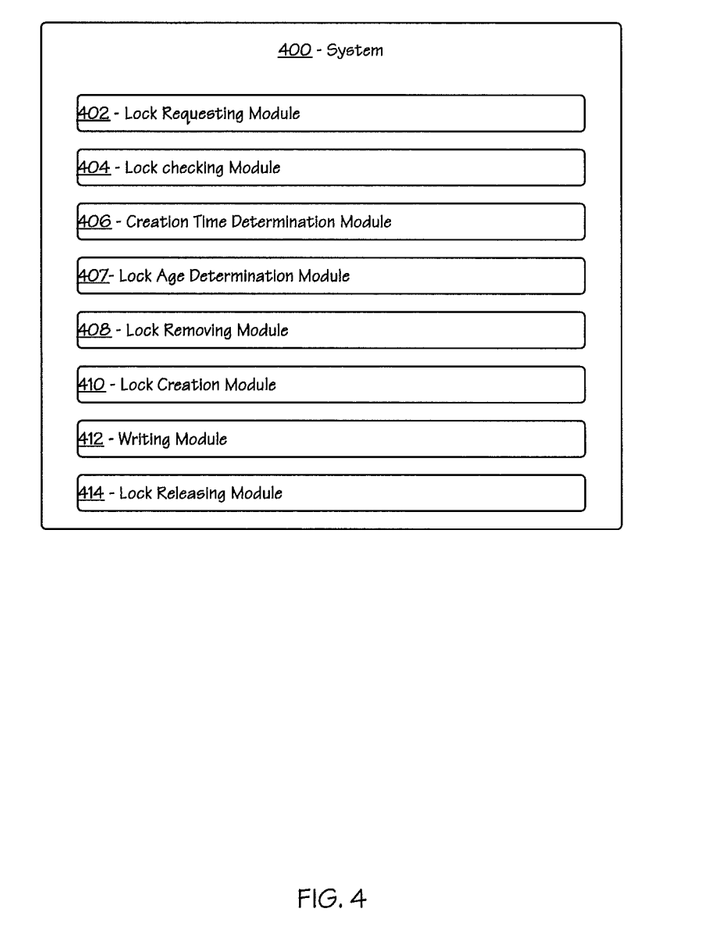
FIG. 4 is a block diagram illustrating a system capable of performing an embodiment.

Turning ahead in the figures, FIG. 4 illustrates a block diagram of a system 400 that is capable of performing disclosed embodiments. System 400 is merely exemplary and is not limited to the embodiments presented herein. System 400 can be employed in many different embodiments or examples not specifically depicted or described herein. In some embodiments, certain elements or modules of system 400 can perform various procedures, processes, and/or acts. In other embodiments, the procedures, processes, and/or acts can be performed by other suitable elements or modules.

In a number of embodiments, system 400 can include lock requesting module 402. In certain embodiments, lock requesting module 402 can perform block 302 (FIG. 3) of a requesting an exclusive lock on a memory location.

In a number of embodiments, system 400 can include lock checking module 404. In certain embodiments, lock checking module 404 can perform block 304 (FIG. 3) of determining if an exclusive lock exists for a specific memory location.

In a number of embodiments, system 400 can include creation time determination module 406. In certain embodiments, creation time determination module 406 can perform block 306 (FIG. 3) of determining the creation time of an existing exclusive lock.

In a number of embodiments, system 400 can include lock age determination module 407. In certain embodiments, lock age determination module 406 can perform block 307 (FIG. 3) of determining the age of an existing exclusive lock.

In a number of embodiments, system 400 can include lock removing module 408. In certain embodiments, lock removing module 408 can perform block 308 (FIG. 3) of removing an exclusive lock from a memory location.

In a number of embodiments, system 400 can include lock creation module 410. In certain embodiments, lock creation module 410 can perform block 310 (FIG. 3) of creating an exclusive lock.

In a number of embodiments, system 400 can include writing module 412. In certain embodiments, writing module 412 can perform block 312 (FIG. 3) of performing a write operation on a memory location.

In a number of embodiments, system 400 can include lock releasing module 414. In certain embodiments, lock releasing module 414 can perform block 314 (FIG. 3) of a releasing a lock.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-4 can be modified, and that the foregoing discussion of certain of these embodiments does not necessarily represent a complete description of all possible embodiments. For example, one or more of the procedures, processes, or activities of FIGS. 1-4 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:
1. A system comprising:
one or more processors; and
one or more non-transitory computer-readable media storing computing instructions configured to run on the one or more processors and perform acts of:
executing a procedure to detect a failed release condition for a memory location in a database indicating when an error has occurred which results in a process failing to release an exclusive lock on the memory location, wherein executing the procedure includes:
setting an age limit for the exclusive lock comprising a first length of time which is utilized to determine whether or not the error has occurred to result in the failed release condition;
determining whether the exclusive lock is present on the memory location;
when the exclusive lock is present on the memory location, determining an age of the exclusive lock on the memory location and a period of time remaining on the first length of time;
when a time requirement to complete a write operation is less than the period of time remaining on the first length of time:

performing the write operation to store data in the database at a location other than the memory location; and performing a read operation while the data from the write operation remains in the database;

when the age of the exclusive lock is greater than the first length of time associated with the age limit:
determining that the failed release condition has occurred;
releasing the exclusive lock on the memory location; and
storing data in the memory location.

2. The system of claim 1, wherein the computing instructions are further configured to perform acts of:
creating the exclusive lock on the memory location; and
releasing the exclusive lock on the memory location after completing an operation on the memory location.

3. The system of claim 2, wherein the computing instructions are further configured to perform an act of:
writing the first length of time and the memory location to a database.

4. The system of claim 1, wherein the computing instructions are further configured to perform acts of:
estimating the time requirement for completing the write operation on the memory location;
determining a remaining time of the first length of time;
aborting the write operation when the time requirement is greater than the remaining time of the first length of time; and
releasing the exclusive lock on the memory location after aborting the write operation.

5. The system of claim 1, wherein:
the first length of time is a maximum allowed age for all memory locations within the system; and
the first length of time is read from a database.

6. The system of claim 1, wherein the computing instructions are further configured to perform acts of:
creating the exclusive lock on the memory location;
writing the first length of time and the memory location to a database;
estimating a time requirement for completing the write operation on the memory location;
determining a remaining time of the first length of time;
aborting the write operation when the time requirement is greater than the remaining time of the first length of time; and
releasing the exclusive lock on the memory location after aborting the write operation, wherein the first length of time is read from the database.

7. The system of claim 1, wherein the procedure is configured to detect failed release conditions resulting from:
errors that originate from a computer device, which is holding the exclusive lock, crashing;
errors that originate from a computer device, which is holding the exclusive lock, becoming disconnected from a network; and
errors that originate from deadlocks or exceptions being utilized with multiple concurrent threads running in a memory space within one computer program.

8. The system of claim 1, determining an age of the exclusive lock location on the memory location.

9. A method comprising:
executing a procedure to detect a failed release condition for a memory location in a database of a non-transitory computer memory, using a processor, indicating when an error has occurred which results in a process failing to release an exclusive lock on the memory location, wherein executing the procedure includes:
setting an age limit for the exclusive lock comprising a first length of time which is utilized to determine whether or not the error has occurred to result in the failed release condition;
determining whether the exclusive lock is present on the memory location;
when the exclusive lock is present on the memory location, determining an age of the exclusive lock of the memory location and a period of time remaining on the first length of time;
when a time requirement to complete a write operation is less than the period of time remaining on the first length of time:
performing the write operation to store data in the database at a location other than the memory location; and
performing a read operation while the data from the write operation remains in the database; and
when the age of the exclusive lock is greater than the first length of time associated with the age limit:
determining that the failed release condition has occurred and releasing the exclusive lock on the memory location.

10. The method of claim 9, further comprising:
creating the exclusive lock on the memory location; and
releasing the exclusive lock on the memory location after completing an operation on the memory location.

11. The method of claim 10, further comprising:
writing the first length of time and the memory location to a database.

12. The method of claim 9, further comprising:
estimating the time requirement for completing the write operation on the memory location;
determining a remaining time of the first length of time;
aborting the write operation when the time requirement is greater than the remaining time of the first length of time; and
releasing the exclusive lock on the memory location after aborting the write operation.

13. The method of claim 9, wherein:
the first length of time is a maximum allowed age for all memory locations within a system.

14. The method of claim 9, wherein:
the first length of time is read from a database.

15. The method of claim 9, further comprising:
creating the exclusive lock on the memory location;
writing the first length of time and the memory location to a database;
estimating a time requirement for completing the write operation on the memory location;
determining a remaining time of the first length of time;
aborting the write operation when the time requirement is greater than the remaining time of the first length of time; and
releasing the exclusive lock on the memory location after aborting the write operation, wherein the first length of time is read from the database.

16. The method of claim 9, determining an age of the exclusive lock location on the memory location.

17. A non-transitory computer readable storage medium having data stored therein representing software executable by a computer, the non-transitory computer readable storage medium comprising:
instructions for executing a procedure to detect a failed release condition for a memory location in a database indicating when an error has occurred which results in a process failing to release an exclusive lock on the memory location, wherein the procedure includes:

instructions for setting an age limit for the exclusive lock comprising a first length of time which is utilized to determine whether or not the error has occurred to result in the failed release condition;

instructions for determining whether the exclusive lock is present on the memory location and a period of time remaining on the first length of time;

when a time requirement to complete a write operation is less than the period of time remaining on the first length of time:

performing the write operation to store data in the database at a location other than the memory location; and performing a read operation while the data from the write operation remains in the database;

instructions for determining an age of the exclusive lock on the memory location when the exclusive lock is present on the memory location:

when the age of the exclusive lock is greater than the first length of time associated with the age limit:

instructions for determining that the failed release condition has occurred and releasing the exclusive lock on the memory location.

18. The non-transitory computer readable storage medium of claim 17, wherein the non-transitory storage medium further comprises:

instructions for creating the exclusive lock on the memory location; and instructions for releasing the exclusive lock on the memory location after completing an operation on the memory location.

19. The non-transitory computer readable storage medium of claim 18, wherein the non-transitory storage medium further comprises:

instructions for estimating the time requirement for completing the write operation on the memory location;

instructions for determining a remaining time of the first length of time;

instructions for aborting the write operation when the time requirement is greater than the remaining time of the first length of time; and instructions for releasing the exclusive lock on the memory location after aborting the write operation.

20. The non-transitory computer readable storage medium of claim 18, wherein the non-transitory computer readable storage medium further comprises:

instructions for writing the first length of time and the memory location to a database.

* * * * *